United States Patent
Ye et al.

(10) Patent No.: US 12,496,660 B2
(45) Date of Patent: Dec. 16, 2025

(54) ULTRA-LONG STEEL STRIP GRATING MANUFACTURING SYSTEM AND MANUFACTURING METHOD USING FEMTOSECOND LASER WITH SPATIOTEMPORAL PARAMETERS COOPERATIVE CONTROL

(71) Applicants: Zhengzhou University of Light Industry, Henan (CN); Wuhan Harmo Robotics Co., Ltd., Hubei (CN)

(72) Inventors: Guoyong Ye, Henan (CN); Zhendong Liu, Henan (CN); Shaobo Jin, Henan (CN); Haifeng Xiao, Henan (CN); Xiaoyu Wen, Henan (CN); Xuling Liu, Henan (CN); Yalin Zhang, Henan (CN)

(73) Assignees: Zhengzhou University of Light Industry, Zhengzhou (CN); Wuhan Harmo Robotics Co., Ltd., Wuhan (CN)

( * ) Notice: Subject to any disclaimer, the term of this patent is extended or adjusted under 35 U.S.C. 154(b) by 361 days.

(21) Appl. No.: 18/137,434

(22) Filed: Apr. 21, 2023

(65) Prior Publication Data
US 2024/0217033 A1     Jul. 4, 2024

(30) Foreign Application Priority Data
Dec. 28, 2022   (CN) .......................... 202211691179.0

(51) Int. Cl.
*B23K 26/361* (2014.01)
*B23K 26/0622* (2014.01)
(Continued)

(52) U.S. Cl.
CPC ........ *B23K 26/361* (2015.10); *B23K 26/0624* (2015.10); *B23K 26/083* (2013.01);
(Continued)

(58) Field of Classification Search
CPC .............. B23K 26/361; B23K 26/0624; B23K 26/083; B23K 26/705; B23K 37/0408;
(Continued)

(56) References Cited

FOREIGN PATENT DOCUMENTS

| CN | 101046397 A | 10/2007 |
|----|-------------|---------|
| CN | 103033138 A | 4/2013  |

(Continued)

OTHER PUBLICATIONS

First notice of examination opinions Dated Jan. 13, 2025 for corresponding Chinese Application No. 202211691179.0 along its English Translation.

*Primary Examiner* — Brian W Jennison
*Assistant Examiner* — Kristina J Babinski

(57) ABSTRACT

An ultra-long steel strip grating manufacturing system using femtosecond laser with spatiotemporal parameters cooperative control, the manufacturing system comprising an unwinding roller, a traction roller and a winding roller, a linear femtosecond laser unit and an electronic shutter being disposed between the unwinding roller and the traction roller and directly above the electronic shutter, a cleaning unit being disposed between the traction roller and the winding roller, a first inspection unit being disposed between the cleaning unit and the winding roller, a second inspection unit being disposed directly above the winding roller, and a plurality of auxiliary roller systems which are driven rollers being disposed along a conveying direction of the steel strip, which achieves a horizontal movement of the steel strip under the electronic shutter, and also achieves a smooth entry of the steel strip into the cleaning unit for cleaning.

7 Claims, 3 Drawing Sheets

(51) Int. Cl.
 *B23K 26/08* (2014.01)
 *B23K 26/70* (2014.01)
 *B23K 37/04* (2006.01)
 *B23K 103/04* (2006.01)

(52) U.S. Cl.
 CPC ........ *B23K 26/705* (2015.10); *B23K 37/0408* (2013.01); *B23K 2103/04* (2018.08)

(58) Field of Classification Search
 CPC .............. B23K 2103/04; B23K 26/082; B23K 26/0846
 See application file for complete search history.

(56) References Cited

FOREIGN PATENT DOCUMENTS

| | | |
|---|---|---|
| CN | 104199144 A | 12/2014 |
| CN | 107322170 A | 11/2017 |
| CN | 110576318 A | 12/2019 |
| CN | 112433289 A | 3/2021 |
| CN | 113732488 A | 12/2021 |
| CN | 220144994 U | 12/2023 |

ULTRA-LONG STEEL STRIP GRATING MANUFACTURING SYSTEM AND MANUFACTURING METHOD USING FEMTOSECOND LASER WITH SPATIOTEMPORAL PARAMETERS COOPERATIVE CONTROL

CROSS-REFERENCE TO RELATED APPLICATIONS

The present application claims priority of Chinese Patent Application No. 202211691179.0, filed on Dec. 28, 2022, the entire contents of which are hereby incorporated by reference.

TECHNICAL FIELD

The application relates to the intelligent manufacturing field, and in particular, relates to an ultra-long steel strip grating manufacturing system and manufacturing method using femtosecond laser with spatiotemporal parameters cooperative control.

DESCRIPTION OF THE PRIOR ART

A precision grating displacement sensor, as the "eye" of an equipment for ultra-precision positioning, is one of the indispensable key sensing components of precision CNC machine tool, electronic manufacturing equipment, and three-coordinate measuring machines, etc., and has gradually expanded to the field of lithography machine.

Compared with transmission grating displacement sensors, precision reflection grating displacement sensors do not have return errors and have higher displacement measurement accuracy. A steel strip grating scale, as the measurement reference of a precision reflection grating displacement sensor, its manufacturing accuracy and manufacturing dimension determine the measurement accuracy and range. Therefore, the high-precision, efficient and ultra-long continuous manufacturing of steel strip gratings has become one of the key technologies of precision reflective grating displacement sensors.

A typical manufacturing method of the steel strip grating includes: 1) lithographic exposure process, in which a substrate is exposed to form a grating structure using a template as a mask, which is the most widely used grating manufacturing process, and it's manufacturing accuracy of grating depends on the accuracy of the template, when manufacturing long grating, it is necessary to splice many times, resulting in a splicing error; 2) holographic exposure process, in which laser interference is used to expose the substrate to form a grating structure, the accuracy of grating pitch depends on the adjustment accuracy of the interference optical path, and the grating manufacturing dimension is limited by the radius of the laser beam; 3) roller-to-roller nanoimprint replication process, which in principle, can achieve ultra-long grating manufacturing, but the manufacturing accuracy is limited by the manufacturing error and wear of the roller imprint mold, and the slip error of the roller imprint process etc.; 4) mechanical micro-marking process, which uses micro-marking with diamond cutters to achieve grating manufacturing, and the manufacturing accuracy of the grating is limited by the cutter stepping accuracy and cutter wear, and the mechanical marking efficiency is low; 5) femtosecond laser direct writing process, in which a "steel knife" is replaced with a "light knife", and a focused laser is used to mark the substrate, therefore there is no problem of cutter's wear, and the edge of the grating is smooth and sharp, however it still encounters the problems that manufacturing accuracy is limited by the "light knife" stepping accuracy and the processing efficiency of ultra-long grating is low.

Chinese invention patent application publication No. CN107322170A discloses a marking system for an ultra-long metal strip grating scale using laser interference feedback, in which the metal strip is transmitted to the laser etching area, and the feedback of the laser etching area is composed of a laser interferometer. The system has a mechanism for repeated movement, which can drive the metal strip to move. Every time the metal strip moves a certain distance, the laser is triggered once to etch a line in the protective film of the metal strip. After the mechanism has moved by a certain distance, the metal strip is locked by a locking device, and the mechanism itself returns to its initial point to repeat the marking. Stepping movement is adopted in this marking system for ultra-long metal strip grating scale to perform marking, thus the marking accuracy is limited by the accuracy stability of the laser interferometer under long-term work and the stepping control accuracy, and the stepping movement efficiency is low, which is difficult to achieve mass production.

Therefore, for the manufacture of ultra-long steel strip gratings, the current manufacturing process faces the problem of manufacturing accuracy contradicting with manufacturing dimension and manufacturing efficiency to a certain extent.

SUMMARY OF THE DISCLOSURE

In order to overcome the above shortcomings of the prior art, the present disclosure provides an ultra-long steel strip grating manufacturing system and manufacturing method using femtosecond laser with spatiotemporal parameters cooperative control, compared with the traditional laser direct writing process with quasi-static start-stop substrate as the processing object, the present disclosure takes a horizontally moving substrate at a constant velocity as the processing object, and a femtosecond laser regulated by temporal switching as an energy beam, through the cooperative control of the spatial parameter and the temporal parameter, to achieve high-precision and efficient manufacturing of the ultra-long steel strip grating.

In order to achieve the above object, the following technical solutions are adopted by the present disclosure.

An ultra-long steel strip grating manufacturing system using femtosecond laser with spatiotemporal parameters cooperative control, includes an unwinding roller, a traction roller and a winding roller, a linear femtosecond laser unit and an electronic shutter being disposed between the unwinding roller and the traction roller and directly above the electronic shutter, a cleaning unit being disposed between the traction roller and the winding roller, a first inspection unit being disposed between the cleaning unit and the winding roller, a second inspection unit being disposed directly above the winding roller, and a plurality of auxiliary roller systems which are driven rollers being disposed along a conveying direction of the steel strip, which achieves a horizontal movement of the steel strip under the electronic shutter, and also achieves a smooth entry of the steel strip into the cleaning unit for cleaning.

The traction roller is a driving roller rotating at a spatial angular velocity $\omega_1$, and the winding roller is a driving roller with a spatial angular velocity $\omega_2$. The outer cylindrical surface of the traction roller has a magnetic or negative pressure structure, and the horizontal movement velocity is $V=R_1\omega_1$ when the steel strip passes under the electronic shutter, wherein $R_1$ is a radius of the traction roller.

The linear femtosecond laser unit is composed of a femtosecond laser, a galvanometer, a focusing lens set, and its output is a linear femtosecond laser spot. The temporal switching frequency of the electronic shutter (4) is f.

In some embodiments, a length of the linear femtosecond laser spot is ranged from 2 to 10 mm, and a width of the spot is ranged from 0.5 to 200 µm. The steel strip is a stainless steel strip having certain flexibility. Preferably, the steel strip has a thickness ranging from 0.1 to 1.5 mm, a width ranging from 3 to 15 mm and a length ranging from 1 to 500 m.

In some embodiments, the winding roller is composed of a metal rigid member and a plastic elastic member. The inner ring of the metal rigid member is provided with rigid inner teeth. Each of elastic arms of the plastic elastic member is of hollow structure, and its end is provided with elastic outer teeth engaged with the rigid inner teeth. The metal rigid member and the plastic elastic member are fitted with each other to achieve overload protection. When $(R_2+\Delta r)\omega_2 > R_1\omega_1$, the winding roller overload and idle to ensure that the rotation of the winding roller does not affect a stability of rotating speed of the traction roller, wherein $R_2$ is a radius of the winding roller, $\omega_2$ is an angular velocity of the winding roller, and $\Delta r$ is an increment of an equivalent radius of the winding roller introduced by winding process of the steel strip grating.

In some embodiments, the first inspection unit is an optical microscope and the second inspection unit is a laser triangular displacement sensor. A cleaning agent used in the cleaning unit is absolute ethyl alcohol.

A manufacturing process utilizing the ultra-long steel strip grating manufacturing system using femtosecond laser with spatiotemporal parameters cooperative control, includes the following steps:

S1. feeding the steel strip substrate: loading the steel strip in roll into the unwinding roller, and pulling a beginning end of the steel strip through the traction roller, the cleaning unit, the winding roller, and the auxiliary roller system, to complete pre-tensioning of the steel strip to be processed;

S2. setting system parameters which includes:

S2-1. setting the spatial angular velocity $\omega_1$ and f: geometric structure features of the steel strip grating scale being cooperatively controlled by the spatial angular velocity $\omega_1$ of the traction roller and the temporal parameter f of the electronic shutter, and a grating period of the steel strip grating being P:

$$P = V/f = R_1\omega_1/f \quad (1)$$

wherein, $R_1$ is the radius of the traction roller; the radius $R_1$ of the traction roller being a known quantity, and the spatial angular velocity $\omega 1$ of the traction roller and the temporal switching frequency f of the electronic shutter being set to meet the constraint condition $P=R_1\omega_1/f$ by taking a structural dimension P of the steel strip grating as a target value;

S2-2. setting the spatial angular velocity $\omega_2$: the radius $R_2$ of the winding roller being a known quantity, and setting the spatial angular velocity $\omega_2$ to meet the constraint condition $R_2\omega_2=(0.7\sim0.8)R_1\omega_1$;

S3. moving the steel strip at a constant velocity: the traction roller driven by the electric motor rotating at the spatial angular velocity $\omega_1$, driving the steel strip to be continuously output at a constant velocity from the unwinding roller, pass through the auxiliary roller system (8-i), and move horizontally under the electronic shutter;

S4. processing the grating with the femtosecond laser: the linear femtosecond laser unit performing localized processing on the steel strip moves horizontally at a constant velocity under the regulation of the temporal switching frequency f of the electronic shutter to form the steel strip grating scale;

S5. cleaning and inspecting the steel strip grating: the manufactured steel strip grating scale being cleaned by the cleaning unit, and the first inspection unit conducting an online quality inspection of the cleaned steel strip grating scale;

S6. winding and storing the steel strip grating: under the action of the winding roller, the steel strip grating scale being gradually wound on the winding roller, and the second inspection unit monitoring the equivalent radius increment $\Delta r$ of the winding roller in real time; when $\Delta r$ reaches a threshold, the winding roller achieving overload protection, then a staff cutting the steel strip grating and removing the outer ring of the current winding roller and the steel strip grating roll, and completing a roll-up storage of the current steel strip grating; replacing with next outer ring of the winding roller and continuing to wind and store the steel strip grating; and S7. continuously feeding and processing the steel strip: after the processing of the current steel strip substrate wound on the unwinding roller, replacing with a next roll of steel strip, repeating the steps of S1-S6, and starting the processing for grating of the next roll of steel strip.

In some embodiments, the traction roller is further connected with a large reduction-ratio reducer.

The large reduction-ratio reducer includes a precision gear to constitute a reduction transmission structure, and has a reduction ratio of K; the precision gear is a driving gear and has a spatial angular velocity of $\omega_0$ under the driving of an electric motor.

The traction roller is a driven wheel with a spatial angular velocity of $\omega_1=K\omega_0$, thus the constant velocity of horizontal movement of the ultra-long steel strip grating is $V=R_1\omega_1=KR_1\omega_0$, wherein $R_1$ is the radius of the traction roller.

A manufacturing process utilizing the ultra-long steel strip grating manufacturing system using femtosecond laser with spatiotemporal parameters cooperative control, includes the following steps:

S1. feeding the steel strip substrate: loading the steel strip in roll into the unwinding roller, and pulling a beginning end of the steel strip through the traction roller, the cleaning unit, the winding roller, and the auxiliary roller system, to complete pre-tensioning of the steel strip to be processed;

S2. setting system parameters which includes:

S2-1. setting the spatial angular velocity $\omega_0$ and f: geometric structure features of the steel strip grating being cooperatively controlled by the spatial angular velocity $\omega_0$ of the precision gear and the temporal parameter f of the electronic shutter, and a grating period of the steel strip grating being P:

$$P = V/f = KR_1\omega_0/f \qquad (2)$$

Wherein, $R_1$ is the radius of the traction roller;

the radius $R_1$ of the traction roller being a known quantity, and the spatial angular velocity $\omega_0$ of the precision gear and the temporal switching frequency f of the electronic shutter being set to meet the constraint condition $P=KR_1\omega_0/f$ by taking a structural dimension P of the steel strip grating as a target value;

S2-2. setting the spatial angular velocity $\omega_2$: the radius $R_2$ of the winding roller being a known quantity, and setting the spatial angular velocity $\omega_2$ to meet the constraint condition $R_2\omega_2=(0.7\sim0.8)R_1\omega_1$;

S3. moving the steel strip at a constant velocity: the traction roller driven by the electric motor rotating at the spatial angular velocity $\omega_1$, driving the steel strip to be continuously output at a constant velocity from the unwinding roller, pass through the auxiliary roller system (8-$i$), and move horizontally under the electronic shutter;

S4. processing the grating with the femtosecond laser: the linear femtosecond laser unit performing localized processing on the steel strip moves horizontally at a constant velocity under the regulation of the temporal switching frequency f of the electronic shutter to form the steel strip grating scale;

S5. cleaning and inspecting the steel strip grating: the manufactured steel strip grating scale being cleaned by the cleaning unit, and the first inspection unit conducting an online quality inspection of the cleaned steel strip grating scale;

S6. winding and storing the steel strip grating: under the action of the winding roller, the steel strip grating scale being gradually wound on the winding roller, and the second inspection unit monitoring the equivalent radius increment $\Delta r$ of the winding roller in real time; when $\Delta r$ reaches a threshold, the winding roller achieving overload protection, then a staff cutting the steel strip grating and removing the outer ring of the current winding roller and the steel strip grating roll, and completing storing the current steel strip grating in roll; replacing with next outer ring of the winding roller and continuing to wind and store the steel strip grating; and S7. continuously feeding and processing the steel strip: after the processing of the current steel strip substrate wound on the unwinding roller, replacing with a next roll of steel strip, repeating the steps of S1-S6, and starting the processing for grating of the next roll of steel strip.

Compared with the prior art, the present application has following beneficial effects.

(1) The ultra-long steel strip grating manufacturing system using laser with spatiotemporal parameters cooperative control provided by the present disclosure, breaks through the quasi-static stepping marking processing mode, and takes a horizontally moving substrate at a constant velocity realized by roller system transmission as the processing object and a femtosecond laser regulated by temporal switching as an energy beam, to achieve continuous and efficient manufacturing of the ultra-long steel strip grating.

(2) The ultra-long steel strip grating manufacturing system using laser with spatiotemporal parameters cooperative control provided by the present disclosure, realizes the regulation of dimension and accuracy of steel strip grating structure by the cooperative control of spatial parameter $\omega_1$ and temporal parameter f, which achieve high-precision and controllable manufacturing of the ultra-long steel strip grating.

(3) The steel strip moves in form of continuous movement at a constant velocity, which compared with the existing stepping movement mode, the grating processing accuracy is higher and the efficiency is higher.

DESCRIPTION OF EMBODIMENTS

Figure 1:
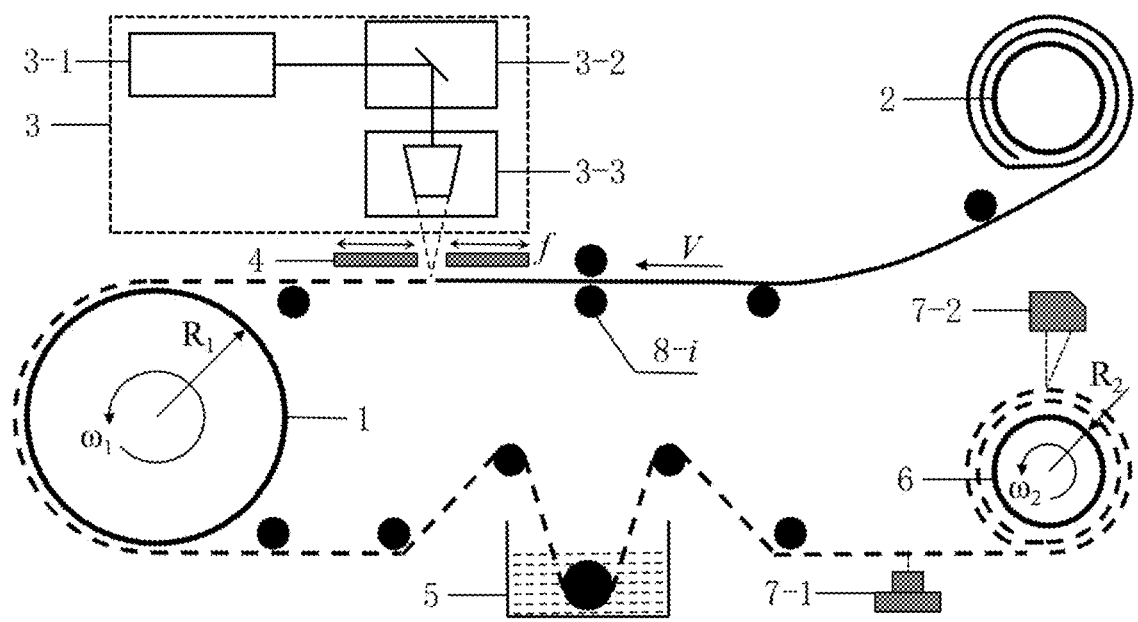
FIG. 1 is a schematic diagram of the system working principle of Embodiment 1 of the present disclosure.
Figure 2:
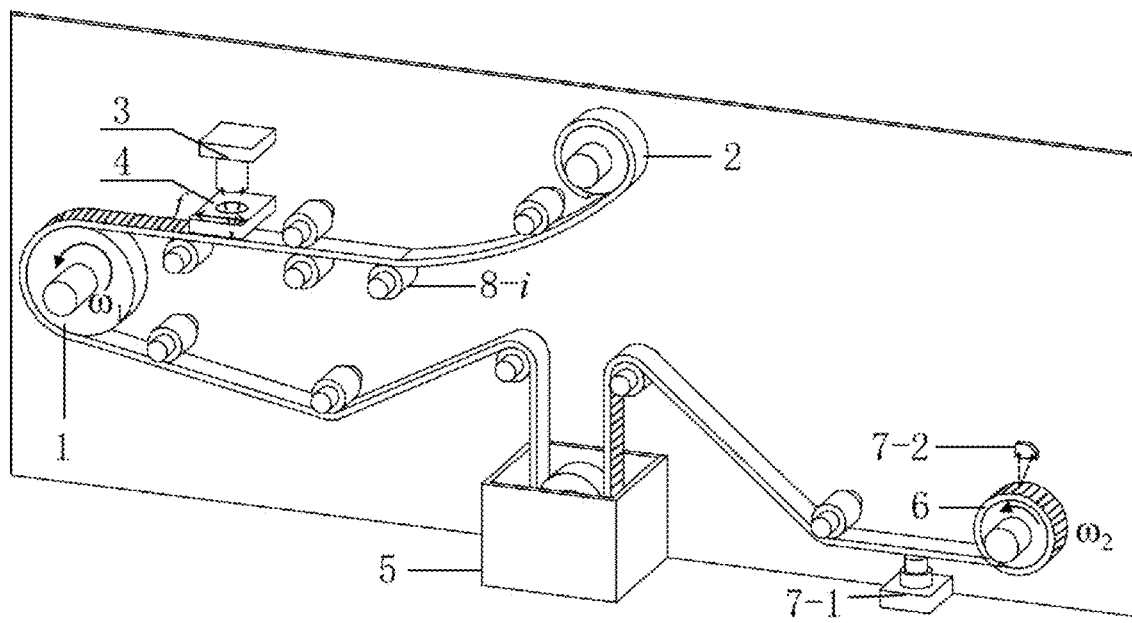
FIG. 2 is a schematic view of the system structure of Embodiment 1 of the present disclosure.
Figure 3:
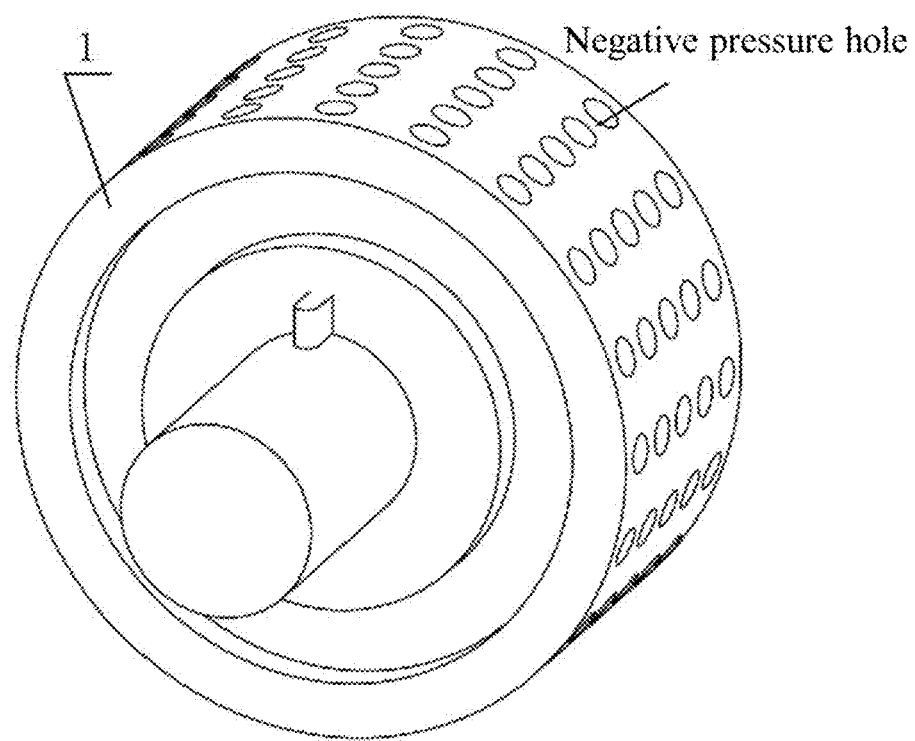
FIG. 3 is a schematic view of the traction roller structure of Embodiment 1 of the present disclosure.
Figure 4:
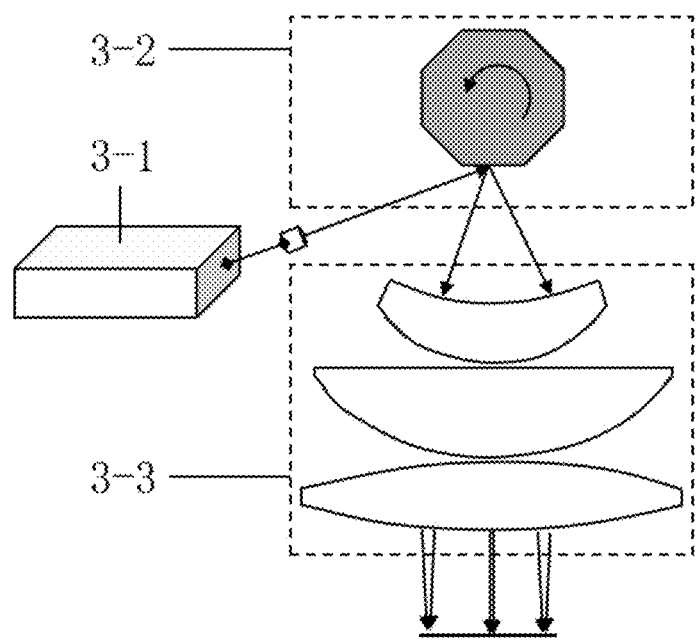
FIG. 4 is a schematic view of a structure of the linear femtosecond laser module of Embodiment 1 of the present disclosure.
Figure 5:
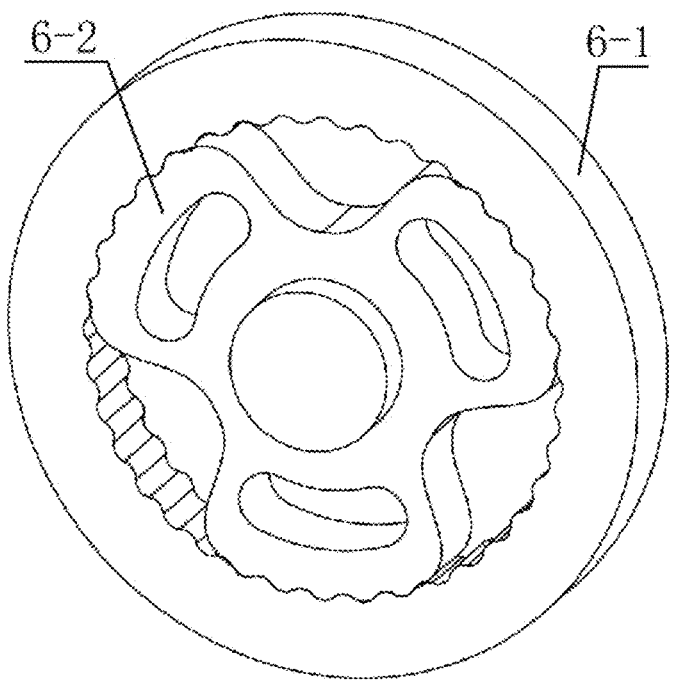
FIG. 5 is a schematic view of an overload protection structure of the winding roller of Embodiment 1 of the present disclosure.

The In order to make the object, technical solutions and advantages of the present disclosure clearer, the present disclosure is further described in detail below in conjunction with the accompanying drawings and specific embodiments. It should be understood that the specific embodiments described herein are only intended to explain the present disclosure and do not constitute a limitation of the present disclosure. Based on the embodiments in the present disclosure, all other embodiments obtained by those of ordinary skill in the art without making creative labor, fall within the scope of the protection of the present disclosure.

Embodiment 1

Refer to FIGS. 1-5, an ultra-long steel strip grating manufacturing system using femtosecond laser with spatiotemporal parameters cooperative control is shown. The manufacturing system includes an unwinding roller 2, a traction roller 1 and a winding roller 6. A steel strip is released from the unwinding roller 2, passes through the traction roller 1 in turn, and finally is wound on the winding roller 6. A linear femtosecond laser unit 3 and an electronic shutter 4 are disposed between the unwinding roller 2 and the traction roller 1 and directly above the electronic shutter 4. A cleaning unit 5 is disposed between the traction roller 1 and the winding roller 6. A first inspection unit 7-1 is disposed between the cleaning unit 5 and the winding roller 6, and a second inspection unit 7-2 is disposed directly above the winding roller 6. A plurality of auxiliary roller systems 8-$i$ which are driven rollers are disposed along a conveying direction of the steel strip, achieving a horizontal movement of the steel strip under the electronic shutter 4, and also a smooth entry of the steel strip into the cleaning unit 5 for cleaning. Wherein the first inspection unit 7-1 is used for online inspection of the manufacturing quality of the grating and the second inspection unit 7-2 is used for the real-time monitoring of the outer diameter of the winding.

The traction roller 1 is a driving roller rotating at a spatial angular velocity $\omega_1$ which drives the steel strip to output from the unwinding roller 2 at a constant velocity, and the winding roller 6 is a driving roller with a spatial angular velocity $\omega_2$ which is used for achieving the roll-up storage of the grating scale.

Preferably, the outer cylindrical surface of the traction roller 1 has a magnetic or negative pressure structure, so that the steel strip fit stably with the transmission cylinder surface of the traction roller 1, preventing the risk of slippage between the steel strip substrate and the traction roller 1, and realizing the continuous horizontal movement at a constant velocity of the ultra-long steel strip substrate. The horizontal movement velocity is $V=R_1\omega_1$ when the steel strip passes under the electronic shutter, wherein $R_1$ is a radius of the traction roller 1.

The linear femtosecond laser unit 3 is composed of a femtosecond laser 3-1, a galvanometer 3-2, and a focusing lens set 3-3. A punctate spot output by the femtosecond laser 3-1 is irradiated to the surface of the galvanometer 3-2. When the galvanometer 3-2 is stationary, the laser is reflected to form a punctate spot, and when the galvanometer 3-2 rotates at high speed, the reflective surface changes at high speed so that the punctate laser spot becomes a linear spot. The focusing lens set 3-3 focus the linear spot further to form a linear femtosecond laser spot with a very small width. Its output linear femtosecond laser spot.

Preferably, a length of the linear femtosecond laser spot is ranged from 2 to 10 mm, and a width of the spot is ranged from 0.5 to 200 μm.

The temporal switching frequency of the electronic shutter 4 is f, and the frequency f can be programmed to control the linear femtosecond laser spot to selectively perform localized processing on the steel strip moves horizontally at a constant velocity to form the steel strip grating scale.

Preferably, the cleaning agent used in the cleaning unit 5 is absolute ethyl alcohol.

Preferably, the winding roller 6 is composed of a metal rigid member 6-1 and a plastic elastic member 6-2. The inner ring of the metal rigid member 6-1 is provided with rigid inner teeth. Each of elastic arms of the plastic elastic member 6-2 is hollow, and its end is provided with elastic outer teeth engaged with the rigid inner teeth. The metal rigid member 6-1 and the plastic elastic member 6-2 are fitted with each other to achieve overload protection. When $(R_2+\Delta r)\omega_2>R_1\omega_1$, the winding roller 6 overload and idle to ensure that the rotation of the winding roller 6 does not affect a stability of rotating speed of the traction roller 1, wherein $R_2$ is a radius of the winding roller 6, $\omega_2$ is an angular velocity of the winding roller 6, and $\Delta r$ is an increment of an equivalent radius of the winding roller 6 introduced by winding process of the steel strip grating.

Preferably, the first inspection unit 7-1 is an optical microscope and the second inspection unit 7-2 is a laser triangular displacement sensor.

The steel strip is a stainless steel strip having certain flexibility.

Preferably, the steel strip has a thickness ranging from 0.1 to 1.5 mm, a width ranging from 3 to 15 mm and a length ranging from 1 to 500 m.

A manufacturing process utilizing the ultra-long steel strip grating manufacturing system using femtosecond laser with spatiotemporal parameters cooperative control includes the following steps:

S1. feeding the steel strip substrate: loading the steel strip in roll into the unwinding roller 2, and pulling a beginning end of the steel strip through the traction roller 1, the cleaning unit 5, the winding roller 6, and the auxiliary roller system 8-i, to complete pre-tensioning of the steel strip to be processed;

S2. setting system parameters which includes sub-steps of S2-1 and S2-2:

S2-1. setting the spatial angular velocity $\omega_1$ and f: geometric structure features of the steel strip grating scale being cooperatively controlled by the spatial angular velocity $\omega_1$ of the traction roller 1 and the temporal parameter f of the electronic shutter 4, and a grating period of the steel strip grating being P:

$$P = V/f = R_1\omega_1/f \tag{1}$$

wherein, $R_1$ is the radius of the traction roller 1;

it can be seen from Equation (1) that the nominal value of P is determined by the parameter matching combination of the spatial angular velocity $\omega_1$ and the temporal parameter f, and the accuracy of P is determined by the control accuracy of the spatial angular velocity $\omega_1$ and the temporal parameter f;

the radius $R_1$ of the traction roller 1 being a known quantity, and the spatial angular velocity $\omega_1$ of the traction roller 1 and the temporal switching frequency f of the electronic shutter being set to meet the constraint condition $P=R_1\omega_1/f$ by taking a structural dimension P of the steel strip grating as a target value;

S2-2. setting the spatial angular velocity $\omega_2$: the radius $R_2$ of the winding roller 2 being a known quantity, and setting the spatial angular velocity $\omega_2$ to meet the constraint condition $R_2\omega_2=(0.7\sim0.8)R_1\omega_1$;

S3. moving the steel strip at a constant velocity: the traction roller 1 driven by the electric motor rotating at the spatial angular velocity $\omega_1$, driving the steel strip to be continuously output at a constant velocity from the unwinding roller 2, pass through the auxiliary roller system 8-i, and move horizontally under the electronic shutter 4;

S4. processing the grating with the femtosecond laser: the linear femtosecond laser unit 3 performing localized processing on the steel strip moves horizontally at a constant velocity under the regulation of the temporal switching frequency f of the electronic shutter 4 to form the steel strip grating scale;

S5. cleaning and inspecting the steel strip grating: the manufactured steel strip grating scale being cleaned by the cleaning unit 5, and the first inspection unit 7-1 conducting an online quality inspection of the cleaned steel strip grating scale;

S6. winding and storing the steel strip grating: under the action of the winding roller 6, the steel strip grating scale being gradually wound on the winding roller 6, and the second inspection unit 7-2 monitoring the equivalent radius increment $\Delta r$ of the winding roller 6 in real time; when $\Delta r$ reaches a threshold, the winding roller 6 achieving overload protection, then a staff cutting the steel strip grating and removing the outer ring of the current winding roller and the steel strip grating roll, and completing a roll-up storage of the current steel strip grating; replacing with next outer ring of the winding roller and continuing to wind and store the steel strip grating; and S7. continuously feeding and processing the steel strip: after the processing of the current steel strip substrate wound on the unwinding roller 2, replacing with a next roll of steel strip, repeating the steps of S1-S6, and starting the processing for grating of the next roll of steel strip.

Preferably, a dimension range of P is 1-400 μm, and an accuracy range of P is 5-50 nm.

Embodiment 2

Figure 6:
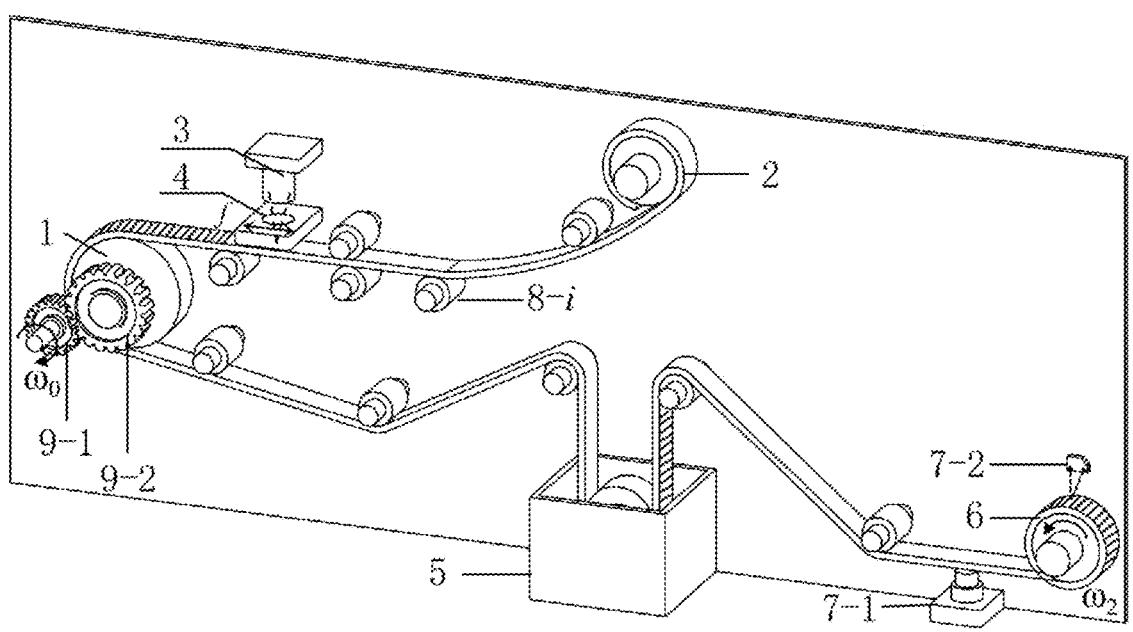
FIG. 6 is a schematic view of the system structure of Embodiment 2 of the present disclosure.

Refer to FIG. 6, compared with Embodiment 1, the traction roller 1 is connected with a large reduction-ratio reducer 9.

The large reduction-ratio reducer 9 includes precision gears 9-1 and 9-2 to constitute a reduction transmission structure, and has a reduction ratio of K. The precision gear 9-1 is a driving gear and has a spatial angular velocity of $\omega_0$ under the driving of an electric motor.

The traction roller 1 is a driven wheel with a spatial angular velocity of $\omega_1 = K\omega_0$, thus the constant velocity of horizontal movement of the ultra-long steel strip grating is $V = R_1\omega_1 = KR_1\omega_0$, wherein $R_1$ is the radius of the traction roller 1.

The geometric structure features of the steel strip grating are cooperatively controlled by the spatial angular velocity $\omega_0$ of the precision gear 9-1 and the temporal parameter f of the electronic shutter 4, and a grating period of the steel strip grating is:

$$P = V/f = KR_1\omega_0/f \quad (2)$$

In Equation (2), K and $R_1$ are known quantities so that the nominal value of P is determined by the parameter matching combination of the spatial angular velocity $\omega_0$ and the temporal parameter f, and the accuracy of P is determined by the control accuracy of the spatial angular velocity $\omega_0$ and the temporal parameter f.

A manufacturing process utilizing the ultra-long steel strip grating manufacturing system using femtosecond laser with spatiotemporal parameters cooperative control includes the following steps:

S1. feeding the steel strip substrate: loading the steel strip in roll into the unwinding roller 2, and pulling a beginning end of the steel strip through the traction roller 1, the cleaning unit 5, the winding roller 6, and the auxiliary roller system 8-i, to complete pre-tensioning of the steel strip to be processed;

S2. setting system parameters which includes sub-steps S2-1 and S2-2:

S2-1. setting parameters $\omega_0$ and f: the radius $R_1$ of the traction roller 1 being a known quantity, and the spatial angular velocity $\omega_0$ of the precision gear 9-1 and the temporal switching frequency f of the electronic shutter being set to meet the constraint condition $P = KR_1\omega_0/f$ by taking a structural dimension P of the steel strip grating as a target value;

S2-2. setting parameter $\omega_2$: the radius $R_2$ of the winding roller 2 being a known quantity, and setting the spatial angular velocity $\omega_2$ to meet the constraint condition $R_2\omega_2 = (0.7 \sim 0.8)R_1\omega_1$;

S3. moving the steel strip at a constant velocity: the traction roller 1 driven by the electric motor rotating at the spatial angular velocity $\omega_1$, driving the steel strip to be continuously output at a constant velocity from the unwinding roller 2, pass through the auxiliary roller system 8-i, and move horizontally under the electronic shutter 4;

S4. processing the grating with the femtosecond laser: the linear femtosecond laser unit 3 performing localized processing on the steel strip moves horizontally at a constant velocity under the regulation of the temporal switching frequency f of the electronic shutter 4 to form the steel strip grating scale;

S5. cleaning and inspecting the steel strip grating: the manufactured steel strip grating scale being cleaned by the cleaning unit 5, and the first inspection unit 7-1 conducting an online quality inspection of the cleaned steel strip grating scale;

S6. winding and storing the steel strip grating: under the action of the winding roller 6, the steel strip grating scale being gradually wound on the winding roller 6, and the second inspection unit 7-2 monitoring the equivalent radius increment Δr of the winding roller 6 in real time; when Δr reaches a threshold, the winding roller 6 achieving overload protection, then a staff cutting the steel strip grating and removing the outer ring of the current winding roller and the steel strip grating roll, and completing a roll-up storage of the current steel strip grating; replacing with next outer ring of the winding roller and continuing to wind and store the steel strip grating; and S7. continuously feeding and processing the steel strip: after the processing of the current steel strip substrate wound on the unwinding roller 2, replacing with a next roll of steel strip, repeating the steps of S1-S6, and starting the processing for grating of the next roll of steel strip.

Comparing Equations (1) and (2), it can be seen that according to Equation (1), assuming that the drive motor produces a rotating speed error $\Delta\omega_i$ at a certain moment, then for Embodiment 1, the resulting manufacturing error of grating dimension is:

$$\Delta P_1 = R_1 \Delta\omega_i / f \quad (3)$$

According to Equation (2), assuming that the drive motor produces a rotating speed error $\Delta\omega_i$ at a certain moment, then for Embodiment 2, the resulting manufacturing error of grating dimension is:

$$\Delta P_2 = KR_1 \Delta\omega_i / f \quad (4)$$

Since the reduction ratio K<1 of the large reduction-ratio reducer 9, $\Delta P_2 < \Delta P_1$. That is, compared with Embodiment 1, Embodiment 2 can provide higher manufacturing accuracy for steel strip grating.

The foregoing is only preferred embodiments of the present disclosure, it should be noted that for those of ordinary skill in the art, without departing from the principles of the present disclosure, certain improvements and retouches may also be made, and these improvements and retouches should also be regarded as the scope of protection of the present disclosure. Each component not specified in the present embodiments may be implemented using prior art.

The invention claimed is:

1. An ultra-long steel strip grating manufacturing system using femtosecond laser with spatiotemporal parameters cooperative control, the manufacturing system comprising an unwinding roller (2), a traction roller (1) and a winding roller (6), a linear femtosecond laser unit (3) and an electronic shutter (4) being disposed between the unwinding roller (2) and the traction roller (1) and directly above the electronic shutter (4), a cleaning unit (5) being disposed between the traction roller (1) and the winding roller (6), a first inspection unit (7-1) being disposed between the cleaning unit (5) and the winding roller (6), a second inspection unit (7-2) being disposed directly above the winding roller (6), and a plurality of auxiliary roller systems (8-$i$) which are driven rollers being disposed along a conveying direction of the steel strip, which achieves a horizontal movement of the steel strip under the electronic shutter (4), and also achieves an entry of the steel strip into the cleaning unit (5) for cleaning;

wherein the traction roller (1) is a driving roller rotating at a spatial angular velocity $\omega_1$, and the winding roller (6) is a driving roller with a spatial angular velocity $\omega_2$; and the outer cylindrical surface of the traction roller (1) has a magnetic or negative pressure structure, and the horizontal movement velocity is $V=R_1\omega_1$ when the steel strip passes under the electronic shutter (4), wherein $R_1$ is a radius of the traction roller (1);

wherein the linear femtosecond laser unit (3) is composed of a femtosecond laser (3-1), a galvanometer (3-2), a focusing lens set (3-3), and its output is a linear femtosecond laser spot; and the temporal switching frequency of the electronic shutter (4) is f;

wherein a length of the linear femtosecond laser spot is ranged from 2 to 10 mm, and a width of the spot is ranged from 0.5 to 200 μm; and the steel strip is a stainless steel strip having flexibility with a thickness ranging from 0.1 to 1.5 mm, a width ranging from 3 to 15 mm and a length ranging from 1 to 500 m; and wherein the winding roller (6) is composed of a metal rigid member (6-1) and a plastic elastic member (6-2); the inner ring of the metal rigid member (6-1) is provided with rigid inner teeth;

each of elastic arms of the plastic elastic member (6-2) is of hollow structure, and its end is provided with elastic outer teeth engaged with the rigid inner teeth; the metal rigid member (6-1) and the plastic elastic member (6-2) are fitted with each other to achieve overload protection; when $(R_2+\Delta r)\omega_2 > R_1\omega_1$, the winding roller (6) idles to ensure that the rotation of the winding roller (6) does not affect a stability of rotating speed of the traction roller (1), wherein $R_2$ is a radius of the winding roller (6), $\omega_2$ is an angular velocity of the winding roller (6), and $\Delta r$ is an increment of an equivalent radius of the winding roller (6) introduced by winding process of the steel strip grating.

2. The manufacturing system according to claim 1, wherein the first inspection unit (7-1) is an optical microscope; the second inspection unit (7-2) is a laser triangular displacement sensor; and a cleaning agent used in the cleaning unit (5) is absolute ethyl alcohol.

3. The manufacturing system according to claim 1, wherein the traction roller (1) is further connected with a large reduction-ratio reducer (9); the large reduction-ratio reducer (9) includes a precision driving gear (9-1) and a precision driven gear (9-2) to constitute a reduction transmission structure, and has a reduction ratio of K; the precision driving gear (9-1) driven by an electric motor has a spatial angular velocity of $\omega_0$; the traction roller (1) is a driven wheel with a spatial angular velocity of $\omega_1=K\omega_0$; the constant velocity of horizontal movement of the ultra-long steel strip grating is $V=R_1\omega_1=KR_1\omega_0$, wherein $R_1$ is the radius of the traction roller (1).

4. A method for manufacturing ultra-long steel strip grating using the manufacturing system according to claim 1, comprising the following steps:

S1. feeding the steel strip substrate: loading the steel strip in roll into the unwinding roller (2), and pulling a beginning end of the steel strip through the traction roller (1), the cleaning unit (5), the winding roller (6), and the auxiliary roller system (8-$i$), to complete pre-tensioning of the steel strip to be processed;

S2. setting system parameters which comprises steps of:

S2-1. setting the spatial angular velocity $\omega_1$ and f: geometric structure features of the steel strip grating scale being cooperatively controlled by the spatial angular velocity $\omega_1$ of the traction roller (1) and the temporal parameter f of the electronic shutter (4), and a grating period of the steel strip grating being P:

$$P = V/f = R_1\omega_1/f \qquad (1)$$

wherein, $R_1$ is the radius of the traction roller (1);

the radius $R_1$ of the traction roller (1) being a known quantity, and the spatial angular velocity $\omega_1$ of the traction roller (1) and the temporal switching frequency f of the electronic shutter being set to meet the constraint condition $P=R_1\omega_1/f$ by taking a structural dimension P of the steel strip grating as a target value;

S2-2. setting the spatial angular velocity $\omega_2$: the radius $R_2$ of the winding roller (2) being a known quantity, and setting the spatial angular velocity $\omega_2$ to meet the constraint condition $R_2\omega_2=(0.7 \text{ to } 0.8)R_1\omega_1$;

S3. moving the steel strip at a constant velocity: the traction roller (1) driven by the electric motor rotating at the spatial angular velocity $\omega_1$, driving the steel strip to be continuously output at a constant velocity from the unwinding roller (2), passing through the auxiliary roller system (8-$i$), and moving horizontally under the electronic shutter (4);

S4. processing the grating with the femtosecond laser: the linear femtosecond laser unit (3) performing localized processing on the steel strip moves horizontally at a constant velocity under the regulation of the temporal switching frequency f of the electronic shutter (4) to form the steel strip grating scale;

S5. cleaning and inspecting the steel strip grating: the manufactured steel strip grating scale being cleaned by the cleaning unit (5), and the first inspection unit (7-1) conducting online quality inspection of the cleaned steel strip grating scale;

S6. winding and storing the steel strip grating: under the action of the winding roller (6), the steel strip grating scale being gradually wound on the winding roller (6), and the second inspection unit (7-2) monitoring the equivalent radius increment $\Delta r$ of the winding roller (6) in real time; when $\Delta r$ reaches a threshold, the winding roller (6) achieving overload protection, then a staff cutting the steel strip grating and removing the outer ring of the current winding roller and the steel strip grating roll, and completing a roll-up storage of the current steel strip grating; replacing with next outer ring of the winding roller and continuing to wind and store the steel strip grating; and S7. continuously feeding and processing the steel strip: after the processing of the current steel strip substrate wound on the unwinding roller (2), replacing with a next roll of steel strip, repeating the steps of S1-S6, and starting the processing for grating of the next roll of steel strip.

5. A method for manufacturing ultra-long steel strip grating using the manufacturing system according to claim 3, comprising the following steps:

S1. feeding the steel strip substrate: loading in roll the steel strip into the unwinding roller (2), and pulling a beginning end of the steel strip through the traction roller (1), the cleaning module (5), the winding roller (6), and the auxiliary roller system (8-$i$), to complete pre-tensioning of the steel strip to be processed;

S2. setting system parameters which comprises steps of:

S2-1. setting the spatial angular velocity $\omega_1$ and f: geometric structure features of the steel strip grating being cooperatively controlled by the spatial angular velocity $\omega_0$ of the precision gear (9-1) and the temporal parameter f of the electronic shutter (4), and a grating period of the steel strip grating being P:

$$P = V/f = KR_1\omega_0/f \qquad (2)$$

wherein $R_1$ is the radius of the traction roller (1).

the radius $R_1$ of the traction roller (1) being a known quantity, and the spatial angular velocity wo of the precision gear (9-1) and the temporal switching frequency f of the electronic shutter being set to meet the constraint condition $P=KR_1\omega_0/f$ by taking a structural dimension P of the steel strip grating as a target value;

S2-2. setting the spatial angular velocity $\omega_2$: the radius $R_2$ of the winding roller (2) being a known quantity, and setting the spatial angular velocity @2 to meet the constraint condition $R_2\omega_2=(0.7$ to $0.8)R_1\omega_1$;

S3. moving the steel strip at a constant velocity: the traction roller (1) driven by the electric motor rotating at the spatial angular velocity ω1, driving the steel strip to be continuously output at a constant velocity from the unwinding roller (2), passing through the auxiliary roller system (8-$i$), and moving horizontally under the electronic shutter (4);

S4. processing the grating with the femtosecond laser: the linear femtosecond laser unit (3) performing localized processing on the steel strip moves horizontally at a constant velocity under the regulation of the temporal switching frequency f of the electronic shutter (4) to form the steel strip grating scale;

S5. cleaning and inspecting the steel strip grating: the manufactured steel strip grating scale being cleaned by the cleaning unit (5), and the first inspection unit (7-1) conducting an online quality inspection of the cleaned steel strip grating scale;

S6. winding and storing the steel strip grating: under the action of the winding roller (6), the steel strip grating scale being gradually wound on the winding roller (6), and the second inspection unit (7-2) monitoring the equivalent radius increment Δr of the winding roller (6) in real time; when Δr reaches a threshold, the winding roller (6) achieving overload protection, then a staff cutting the steel strip grating and removing the outer ring of the current winding roller and the steel strip grating roll, and completing a roll-up storage of the current steel strip grating; replacing with next outer ring of the winding roller and continuing to wind and store the steel strip grating; and S7. continuously feeding and processing the steel strip: after the processing of the current steel strip substrate wound on the unwinding roller (2), replacing with a next roll of steel strip, repeating the steps of S1-S6, and starting the processing for grating of the next roll of steel strip.

6. The method according to claim 4, wherein a dimension range of the steel strip grating period P ranges from 1 to 400 μm, and an accuracy range of P ranges from 5 to 50 nm.

7. The method according to claim 5, wherein a dimension range of the steel strip grating period P ranges from 1 to 400 μm, and an accuracy range of P ranges from 5 to 50 nm.

* * * * *